United States Patent
Li et al.

(10) Patent No.: US 9,424,261 B2
(45) Date of Patent: Aug. 23, 2016

(54) TECHNIQUES TO TAKE CLEAN DATABASE FILE SNAPSHOT IN AN ONLINE DATABASE

(71) Applicant: Oracle International Corporation, Redwood Shores, CA (US)

(72) Inventors: Yunrui Li, Fremont, CA (US); William H. Bridge, Jr., Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 183 days.

(21) Appl. No.: 14/243,792

(22) Filed: Apr. 2, 2014

(65) Prior Publication Data

US 2015/0286649 A1 Oct. 8, 2015

(51) Int. Cl.
*G06F 17/30* (2006.01)

(52) U.S. Cl.
CPC .... *G06F 17/30088* (2013.01); *G06F 17/30377* (2013.01)

(58) Field of Classification Search
CPC .................. G06F 17/30286; G06F 17/30575; H04L 29/0854
USPC ......... 707/624, 610, 655, 611, 639, 769, 634, 707/674; 711/114, 141, 112, 103
See application file for complete search history.

(56) References Cited

U.S. PATENT DOCUMENTS

| | | | |
|---|---|---|---|
| 6,178,428 B1 | 1/2001 | Pystynen et al. | |
| 6,366,928 B1 | 4/2002 | Davy | |
| 7,334,094 B2 * | 2/2008 | Fair ................... | G06F 17/30067 707/E17.01 |
| 7,885,923 B1 * | 2/2011 | Tawri .................. | G06F 11/2064 707/610 |
| 8,150,805 B1 * | 4/2012 | Tawri .................. | G06F 21/6218 707/610 |
| 8,401,997 B1 * | 3/2013 | Tawri .................. | G06F 11/2064 707/655 |
| 8,996,827 B1 * | 3/2015 | Natanzon ............. | G06F 12/063 711/114 |
| 9,002,791 B2 * | 4/2015 | Chakrabarti ...... | G06F 17/30359 707/634 |
| 2002/0099729 A1 * | 7/2002 | Chandrasekaran . | G06F 11/1471 |
| 2003/0229609 A1 | 12/2003 | Haugh | |
| 2005/0108232 A1 | 5/2005 | Rockey | |
| 2005/0182774 A1 | 8/2005 | Weir et al. | |
| 2009/0319532 A1 | 12/2009 | Akelbein et al. | |
| 2010/0145909 A1 * | 6/2010 | Ngo ..................... | G06F 11/1471 707/611 |
| 2010/0228913 A1 * | 9/2010 | Czezatke ............ | G06F 11/1451 711/112 |
| 2012/0079207 A1 * | 3/2012 | Yochai ................ | G06F 11/1451 711/141 |
| 2013/0013890 A1 * | 1/2013 | Manner ................ | A23G 1/0066 711/207 |
| 2013/0173686 A1 | 7/2013 | Hu et al. | |

(Continued)

OTHER PUBLICATIONS

U.S. Appl. No. 13/630,582, filed Sep. 28, 2012, Office Action, Feb. 28, 2014.

(Continued)

*Primary Examiner* — Jeffrey A Burke
*Assistant Examiner* — Thong Vu
(74) *Attorney, Agent, or Firm* — Hickman Palermo Becker Bingham LLP (57) ABSTRACT

Techniques are described herein for making a clean file snapshot of a target file. The techniques may be applied to a single target file, to a set of target files, or to an entire database The techniques involve transitioning the target file through a series of states. During each state, particular actions are performed and/or prevented. In the final state of each approach, a clean file snapshot of the target file exists. Transitioning through the states, only one of which does not allow new changes to be made to the target file, allows the database to remain online and available to a greater extent than is possible with an approach that prevents database changes for the duration of the clean file snapshot creation operation.

20 Claims, 8 Drawing Sheets

(56) References Cited

U.S. PATENT DOCUMENTS

| | | | |
|---|---|---|---|
| 2013/0332660 A1* | 12/2013 | Talagala | G06F 12/0246 711/103 |
| 2014/0095553 A1 | 4/2014 | Panteleenko et al. | |
| 2015/0134616 A1* | 5/2015 | Zheng | G06F 17/30575 707/639 |
| 2015/0134879 A1* | 5/2015 | Zheng | G06F 17/30575 711/103 |

OTHER PUBLICATIONS

U.S. Appl. No. 13/630,582, filed Sep. 28, 2012, Final Office Action, Jul. 9, 2014.

U.S. Appl. No. 13/630,582, filed Sep. 28, 2012, Office Action, Oct. 2, 2014.

U.S. Appl. No. 13/630,582, filed Sep. 28, 2012, Office Action, Oct. 20, 2014.

U.S. Appl. No. 13/630,582, filed Sep. 28, 2012, Final Office Action, Mar. 26, 2015.

U.S. Appl. No. 13/630,582, filed Sep. 28, 2012, Notice of Allowance, Jul. 7, 2015.

U.S. Appl. No. 13/360,582, filed Sep. 28, 2012, Notice of Allowance, Jul. 7, 2015.

* cited by examiner

TECHNIQUES TO TAKE CLEAN DATABASE FILE SNAPSHOT IN AN ONLINE DATABASE

RELATED APPLICATIONS

This application is related to U.S. patent application Ser. No. 13/630,582, entitled "TECHNIQUES FOR MOVING DATA FILES WITHOUT INTERRUPTING ACCESS", filed Sep. 28, 2012, the entire contents of which is incorporated herein by reference.

FIELD OF THE INVENTION

The present invention relates to taking a clean database file snapshot in an online database.

BACKGROUND

A "clean file snapshot" is a copy of a database, or a portion thereof, that reflects all changes made to the database as of a specific time, and no changes made to the database after the specific time. The specific time before which the copy reflects all changes, and after which the copy reflects no changes, is referred to as the "snapshot time" of the copy. For the purposes of creating a clean file snapshot, "changes made to the database" includes all changes made to the database, regardless of whether the changes have been "committed".

One way to make a clean file snapshot of a database is to
 stop any changes to the database
 flush to disk all dirty buffers to bring the disk copy of the database up-to-date, and
 make a backup copy of the up-to-date copy of the database After the backup copy of the database has been made, the original copy may be made available again for new changes. The backup copy thus created represents a clean file snapshot because the backup copy reflects all changes made up to a particular point in time, and no changes made after the particular point in time. In this example, the snapshot time of the backup copy would be the time at which the database system stopped allowing changes to the database.

Unfortunately, preventing transactions from updating the database until the data files are copied can result in an unacceptable delay, impairing both performance and availability of the database. However, if transactions are allowed to make changes during the file copy process, then the resulting backup copy will be "fuzzy" rather than clean. Specifically, because updates are not prevented, updates may be made, after the snapshot time, to a portion of the database that has not yet been copied. During the copy operation, those updates will be copied to the backup copy.

The foregoing is an example of how a "fuzzy" backup of the database can be created without taking the database offline. The backup is "fuzzy" because the copied files are not guaranteed to only have changes that occurred before a given time. After a "fuzzy" backup is made, the backup may be "cleaned up" to make a clean file snapshot (e.g. by applying necessary redo). However, such cleanup operations can become complicated and error prone.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Multiple approaches are described herein for making a clean file snapshot of a database. The clean file snapshot may be of the entire database, of one or more pluggable tablespaces, or of any set of one or more data files used by the database.

As shall be described in greater detail hereafter, each approach involves transitioning the database through a series of states. During each state, particular actions are performed and/or prevented. In the final state of each approach, a clean file snapshot exists. Transitioning through the states allows the database to remain online and available to a greater extent than is possible with an approach that prevents database changes for the duration of the clean file snapshot creation operation.

Multi-Instance Databases

Figure 1:
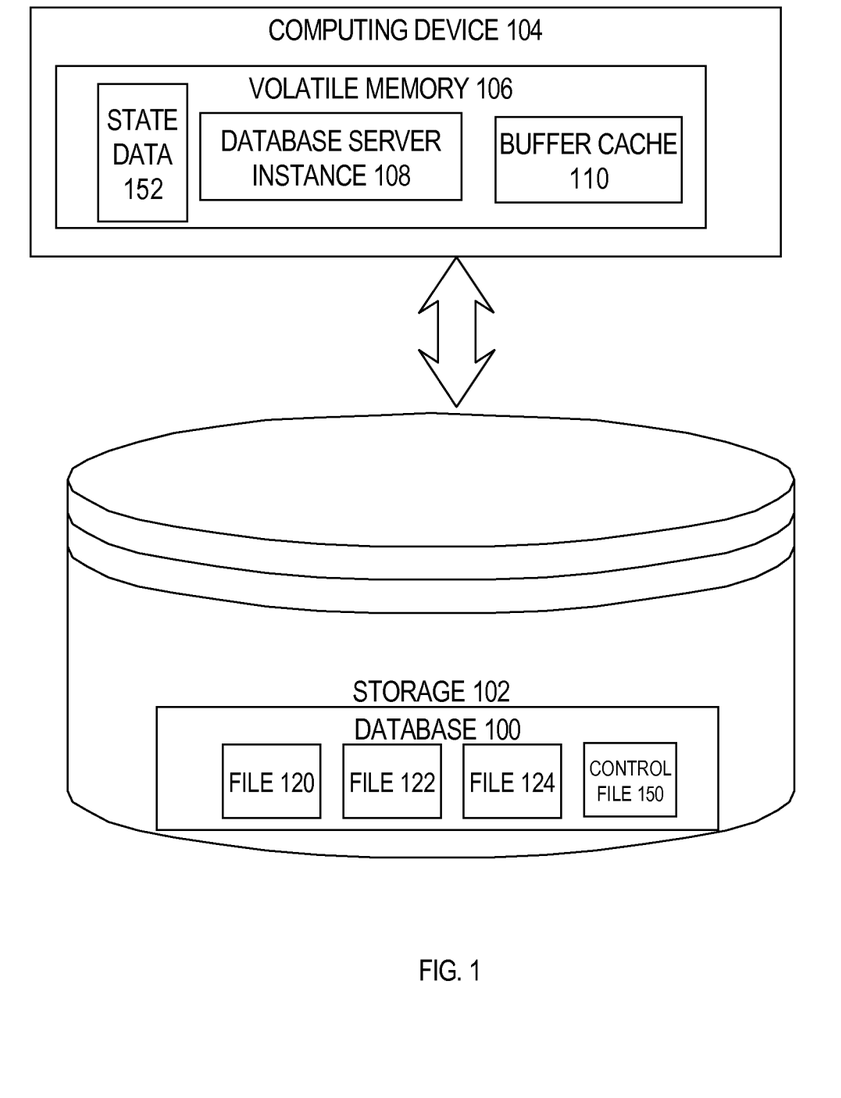
FIG. 1 is a block diagram of a database system having a single database instance.

A database may be managed by a single database instance, or by multiple database instances that share access to the storage device(s) on which the database is durably stored. FIG. 1 is a block diagram of a single database instance.

Referring to FIG. 1, a database 100 is stored on a storage device 102. Database 100 is managed by a single database server instance 108 executing in a computing device 104 that has access to storage device 102. Volatile memory 106 of the computing device 104 stores both the database server instance 108 and a buffer cache 110 for temporarily storing data blocks retrieved from database 100. The data stored in database 100 is typically spread across numerous files. To simplify explanation, database 100 is illustrated as having three files 120, 122 and 124. However, databases may have significantly more than three files.

Figure 2:
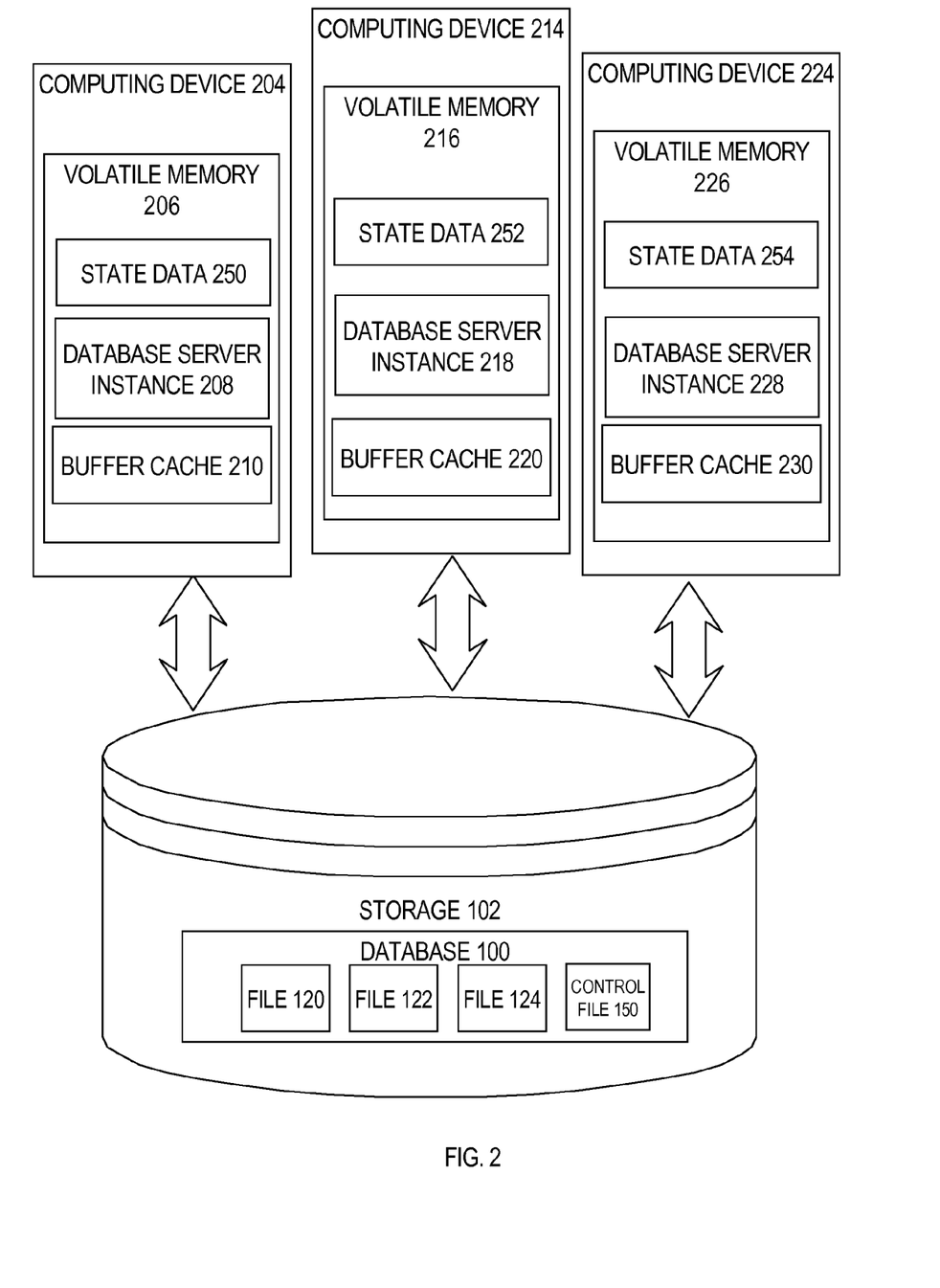
FIG. 2 is a block diagram of a multi-instance database system.

Referring to FIG. 2, it is a block diagram of a multi-instance database environment. Specifically, the same database 100 resides on the same storage device 102 as was shown in FIG. 1. However, unlike FIG. 1, in the multi-instance database environment of FIG. 2, database 100 is managed by multiple database server instances. In particular, database 100 is managed by instances 208, 218 and 228 executing respectively on computing devices 204, 214 and 224. Those computing devices have volatile memory 206, 216 and 226 that implements buffer caches 210, 220 and 230.

In one embodiment, each of database server instances 208, 218 and 228 maintains its own logical clock for assigning timestamps to events involving database 100. For example, when a write operation is performed by database server instance 208, the logical clock maintained by database server instance 208 is used to assign a timestamp to the write operation.

Since each of the database server instances 208, 218 and 228 independently maintains its logical clock, the database server instances communicate with each other to ensure that the timestamps assigned to dependent events are higher than the timestamps assigned to the events upon which they depend. For example, if a transaction in database server instance 208 updates a row at time T1, and another transaction in database server instance 218 updates the same row at a later time T2, the transaction in database server instance 218 must be assigned a higher timestamp than the transaction in database server instance 208. Various techniques have been developed to ensure the logical clocks of multi-instance systems stay sufficiently synchronized to ensure correctness. One such technique, for example, is described in U.S. Pat. No. 8,169,856 entitled "Time Synchronization In Cluster Systems", which is hereby incorporated by reference.

As shall be explained in greater detail hereafter, certain additional actions are performed when creating a clean file snapshot in a multi-instance database environment that need not be performed when creating a clean file snapshot in a single-instance database environment.

Changing State

As mentioned above, techniques are described herein for making clean file snapshots of one or more files of a database. The techniques involve transitioning the database, or one or more files within the database, from state to state. Consequently, there is a need to keep a record of the current state of the files.

Various techniques may be used to track the current state of files. According to one embodiment, the database includes a control file 150 (in FIG. 1) for storing the state of files. In such an embodiment, changing the state of a file merely involves updating the state information for that file within the control file 150.

To avoid having to access the disk every time the state of a file must be ascertained, each database instance may also store the state information in volatile memory. For example, after reading control file 150, database server instance may store state data 152 in volatile memory 106.

In multi-instance database systems, any one of the instances can change the state of a file by updating the state information file within the control file 150. Because the control file 150 is on disk to which all other instances have access, those other instances may read the control file to ascertain the current state of any file. As illustrated in FIG. 2, instances 208, 218 and 228 store the state information that they read from the control file 150 in their respective volatile memories. In FIG. 2, the locally-stored state information is illustrated as state data 250, 252, and 254.

Within a multi-instance database system, when a new instance comes online, the instance reads the control file to determine the state of all data files within the database. This prevents newly-started instances from interacting with files in a manner that is not permitted by the current state of the files.

Copy-Before-Split Approach

Figure 3:
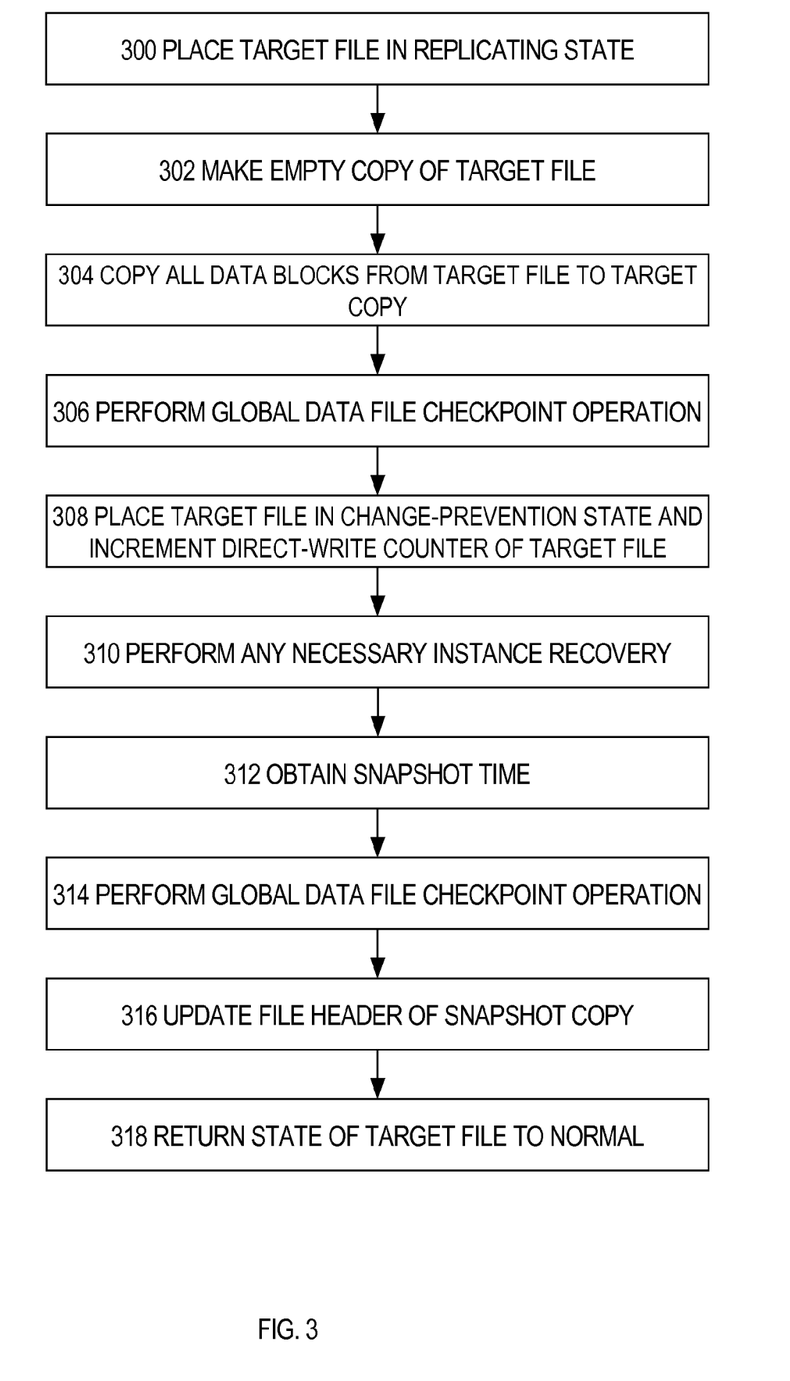
FIG. 3 is a flowchart illustrating steps for performing a clean file snapshot, according to one embodiment of a copy-before-split approach.

Referring to FIG. 3, it is a flowchart for creating a clean file snapshot, according to one embodiment. The approach for creating a clean file snapshot that is illustrated in FIG. 3 is referred to herein as the "copy-before-split" approach. Alternatives to the copy-before-split approach shall be described hereafter with respect to FIGS. 5 and 6.

As mentioned above, a clean file snapshot may be performed relative to a single data file of the database, any arbitrary group of data files of the database, a pluggable tablespace, or the entire database. For the purposes of explanation, examples shall be described in which a clean file snapshot is made of a single file. However, the techniques described herein are equally applicable to groups of data files, pluggable tablespaces, and the entire database.

The file for which a clean file snapshot is made shall be referred to herein as the "target file". Initially, only one copy of the target file exists. The existing copy of the file, which is part of the database, is referred to herein as the "primary copy". A second copy of the target file is made in order to create a clean file snapshot. The second copy is referred to herein as the "snapshot copy".

The Replicating State

In FIG. 3, at step 300 the primary copy of the target file is placed in a "REPLICATING" state. While the primary copy is in the REPLICATING state, the following rules are in effect:
  New changes to the target file are allowed.
  I/O to the target file is allowed. Thus, transactions can continue to read from the primary copy of the target file, and continue to write to disk any already-dirty blocks of the target file.
  Attempts to read data from the target file are directed to the primary copy.
  When already-dirty blocks of the target file are written to disk, they are written to both the primary copy and the snapshot copy.
  Any attempts to extend the size of the target file are put on hold (or, alternatively, performed concurrently on both the primary copy and the snapshot copy)

While the target file is in the replicating state, steps 302, 304 and 306 are performed. Specifically, at step 302, a snapshot copy of the target file is created. The snapshot copy is allocated the same size as the primary copy, but initially has no data.

At step 304, all data blocks in the primary copy are copied to the snapshot copy. Significantly, the primary-copy-to-snapshot-copy block copy operations proceed during the same period in which already-dirty blocks of the target file are being written to both the primary copy and the snapshot copy. Thus, while in the replicating state, the snapshot copy is receiving data blocks from both the primary copy, and from newly performed write-to-disk operations.

At step 306, a global data file checkpoint is performed relative to the target file. A global data file checkpoint of a file is an operation in which all dirty buffers, within the buffer cache 110, containing data for that file are flushed to disk. In the present example, all dirty buffers within buffer cache 110 that contain updates to the target file are written to disk. Because these write operations are performed while the target file is in the replicating state, the writes are performed to both the primary copy and the snapshot copy.

Significantly, because new changes to the target file are allowed during the replicating state, additional buffers of the target file may be dirtied during the global data file checkpoint operation. Thus, at the end of the global data file checkpoint operation, all dirty buffers of the target file that were in volatile memory at the time the global data file checkpoint was initiated will have been written to disk. However, buffer cache 110 may at that point have new dirty buffers of the target file, for those changes made to the target file after the global data file checkpoint was started.

For example, assume that when the global data file checkpoint operation starts, buffers A, B, D, E and G store changes to the target file that have not yet been written to disk. In this example, the global data file checkpoint operation performed at step 306 would involve writing buffers A, B, D, E and G to disk (to both the primary and snapshot copies). While the global file checkpoint operation is taking place, new updates to the target file can be made (e.g. in buffers C and H). Thus, even after completion of the global data file checkpoint operation, it is possible for the buffer cache 110 to have one or more dirty buffers associated with the target file.

It should be noted that write I/O operations that target the snapshot copy, made by the global data file checkpoint operation while the copy operation is in progress, need to look at various counters to make sure that those write I/O operations are not conflicting with the copy operation. An example of how counters may be used to avoid conflict between (a) write I/O of the global data file checkpoint operation and (b) changes to the snapshot copy made during the copy operation, is described in U.S. patent application Ser. No. 13/630,582, entitled "TECHNIQUES FOR MOVING DATA FILES WITHOUT INTERRUPTING ACCESS", filed Sep. 28, 2012, the entire contents of which is incorporated herein by reference.

After the global file checkpoint has completed, the target file is placed in a "CHANGE-PREVENTION" state, at step 308. Also at step 308, a direct-write counter of the target file is incremented. How the direct-write counter is used shall be described in greater detail hereafter with reference to FIG. 4.

As explained above, this state change may involve changing state information in the control file 150. Based on the changed state information in the control file 150, each database server instance changes its local state data (e.g. state data 152). Changed state information may also be communicated directly from one database server instance to other database server instances.

The Change-Prevention State

In the CHANGE-PREVENTION state, the following rules are in effect:
 New changes to the target file are held up.
 Redo generation will hang in the redo generation routine without holding hash latches or holding any current buffers pin exclusive, if the set of changes touch the target file. The hang will last until redo generation is no longer suspended.
 No new non-logged cleanout is performed. The synchronization can be achieved by getting/releasing a correct set of latches (all hash latches) after an instance enters the state for the file.
 Direct writes to the target object are prevented.
 Read I/Os are issued to the primary copy only.
 Write I/Os (for changes performed to the target item before entering the CHANGE-PREVENTION state) are issued to both the primary copy and the snapshot copy During the CHANGE-PREVENTION state, no new changes to data in the target file are permitted. For example, if a transaction were to attempt to insert a row in a table whose data is stored in the target file, the transaction will be suspended before the appropriate cached block of the target file is updated, in volatile memory, to include the new row. Because such changes are prevented during this state, no new redo is generated for the target file.

According to one embodiment, when in a multi-instance environment, placing the target file in the CHANGE-PREVENTION state involves a cross instance call, which does not complete until all instances have transitioned into the new state completely. These cross instance calls may also be used to perform the communications necessary to ensure that the database server instance that makes the calls has a logical clock value that is at least as high as the current logical clock values of all other database instances in the multi-instance environment.

According to one embodiment, the processes responsible for instance recovery do not hang with attempting to change data in the target file while in the CHANGE-PREVENTION state. Rather, instead of hanging, these processes signal a lock conflict. Signaling a lock conflict frees those processes up to perform instance recovery while the target file is in the CHANGE-PREVENTION state.

According to one embodiment, transactions that are suspended during the CHANGE-PREVENTION state because the processes have requested changes to the target file can proceed to do other work. Specifically, rather than simply waiting for a state change that will allow them to make the changes to the target file, those transactions may proceed to perform other work while awaiting to make the changes to the target file.

Free-Space Direct Writes

With respect to direct write operations, one type of direct write operation involves writing data to free space while generating redo, and then changing the space metadata to indicate that the written-to free space is no longer free, but instead is part of an existing database object. Such direct write operations are referred to herein as free-space direct writes.

According to one embodiment, to prevent free-space direct writes to a target file while the target file is in CHANGE-PREVENTION state, a "direct-write counter" is maintained for the target file. The direct-write counter of the target file is incremented when the target file enters the CHANGE-PREVENTION state, as indicated in step 308. The direct-write counter for the target file is checked before and after each free-space direct write I/O to the target file. Specifically, in one embodiment the database system handles free-space direct write operations as indicated in FIG. 4.

Figure 4:
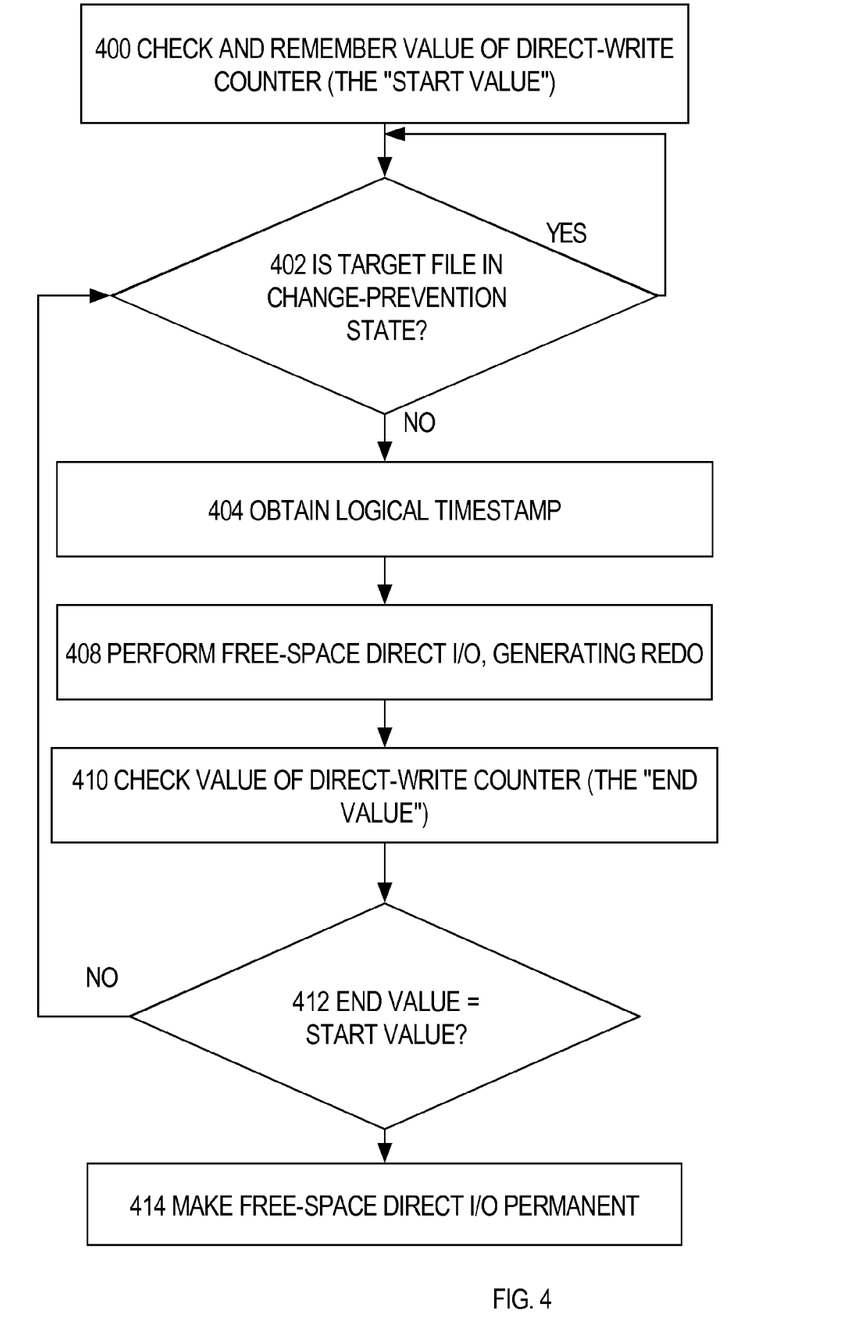
FIG. 4 is a flowchart illustrating steps for ensuring that direct writes are prevented during periods in which no changes are allowed to a target object, according to one embodiment.

Referring to FIG. 4, it is a flowchart that illustrates how free-space direct write I/O is handled according to one embodiment. At step 400, the database system that is performing the direct write I/O checks and remembers the value of the direct-write counter (the "start value"), At step 402, the database system checks whether the target file is currently in the CHANGE-PREVENTION state. If the target file is currently in the CHANGE-PREVENTION state, then the database server waits until the target file is not in the CHANGE-PREVENTION state.

When the target file is not in, or ceases to be in, the CHANGE-PREVENTION state, control passes to step 404 where a logical timestamp is obtained. The logical timestamp obtained in step 404 is to be used to indicate the time at which the free-space direct write I/O is performed.

At step 408, the free-space direct write I/O is performed, generating redo. The write I/O and the generation of the corresponding redo may be performed in either order (i.e. write first or redo first). At step 410, the value of the direct-write counter is checked again. The value obtained in step 410 is referred to herein as the "end value". At step 412, it is determined whether the start value is the same as the end value. If the start value is not the same as the end value, then control passes back to step 402 and steps 402 to 412 are repeated relative to the same I/O request. During the repeat performance of steps 402 to 412, the same I/O is performed, but a different (later) logical timestamp is obtained for the I/O.

If, at step 412, the start value is the same as the end value, then control passes to step 414 and the free-space direct I/O is made a part of the target file. Thus, free-space direct write I/O operations are prevented from starting while the target is in the CHANGE-PREVENTION state, and are prevented from completing if the target file enters the CHANGE-PREVENTION state before the free-space direct write I/O operation has completed. This ensures that the data written in any given free-space direct write I/O operations is either (a) assigned a timestamp before the snapshot time and included in the clean file snapshot, or (b) assigned a timestamp after the snapshot time and excluded from the clean file snapshot.

Operations Performed During the
Change-Prevention State

Referring again to FIG. 3, it illustrates various operations that are performed while the target file is in the CHANGE-PREVENTION STATE. Specifically, at step 310 any necessary instance recovery is performed, and a snapshot time is obtained. Instance recovery will typically only be necessary in a multi-instance environment, such as that shown in FIG. 2, and only if one or more of the database instances have experienced a failure.

Instance recovery is necessary under these circumstances because the snapshot time obtained in step 310 must be at least as high as the highest value of any logical clock in the multi-instance environment. If a database instance is currently in a failed state, the highest value of its logical clock may not be readily ascertained until instance recover is performed.

As an alternative to performing instance recovery in step 310, the logs of a failed instance may be scanned to ascertain the highest logical time value that was assigned by the failed instance. After obtaining that value, the snapshot time may be determined in step 310 before the failed instance is fully restored.

Because the snapshot time is higher than any timestamp assigned by any of the database instances that have access to the database containing the target file, it is guaranteed that there are no changes to the target file where the redo of the changes has been assigned a timestamp higher than the snapshot time. Any transaction attempting to make any such changes to the target file would be suspended before making the changes, because the target file is in the CHANGE-PREVENTION state.

At step 314, while the target file is still in the CHANGE-PREVENTION state, another global data file checkpoint operation is performed. This operation is similar to the operation performed at step 306, except that, because the target file is in the CHANGE-PREVENTION state, upon completion of the global data file checkpoint operation, all changes made to the target file will have been written to disk. Further, because the target file is in the CHANGE-PREVENTION state, those write operations will have been performed on both the primary copy and the snapshot copy of the target file.

If an instance fails while the global data file checkpoint operation of step 314 is being performed in a multi-instance environment, then instance recovery is performed, as described above with reference to step 310.

Typically, the global check point operation performed in step 314 can be performed relatively quickly because of the global check point operation performed in step 306. Specifically, because of the global checkpoint operation performed in step 306, the only dirty buffers that will exist when the global data file checkpoint operation is performed in step 314 are buffers that were dirtied by updates to the target file that occurred between step 306 (the first global data file checkpoint operation) and step 308 (transition to the CHANGE-PREVENTION state).

Significantly, the timestamps associated with the updates that are flushed to disk during step 314 are necessarily below the snapshot time obtained in step 312 because those updates can only have occurred before the target file was placed in the CHANGE-PREVENTION state (step 308), and the snapshot time was obtained after the target file was placed in the CHANGE-PREVENTION state. Consequently, after performing the global data file checkpoint operation in step 314, both the primary copy and the snapshot copy will have all changes made to the target file before the snapshot time, and no changes that are made to the target file after the snapshot time. Thus, the snapshot copy will be a clean file snapshot of the target file as of the snapshot time.

At step 316, the file header of the snapshot copy is updated with the timestamp captured in step 312, to indicate that the snapshot copy is a snapshot that reflect the state of the target file as of the time reflected in that timestamp. Control then proceeds to step 318 where the state of the target file is returned to a NORMAL state. In the NORMAL state, updates to the target file are allowed, any transactions that were suspended because they attempted to update the target file during the CHANGE-PREVENTION state cease to be suspended, redo is generated as normal, and all read and write I/Os are directed against only the primary copy of the target file.

While FIG. 3 provides steps for making a clean file snapshot of a single file, those same steps may be performed concurrently on any number of files, and may even be performed on all files at once to make a clean file snapshot of the entire database. When performed on multiple target files at once, the file copy operations can be offloaded to slave processes, to reduce overall time.

Increased Availability

Significantly, updates to the target file are only prevented between step 308 (when the target file is placed in the CHANGE-PREVENTION state) and step 318 (when the target file is returned to the NORMAL state). Consequently, the amount of time that the target file is unavailable is significantly less than the amount of time that the target file is unavailable using prior approaches.

Further, many types of operations may be performed concurrently on the target file while a clean file snapshot of the file is being made using the techniques described herein.

Those operations, such as an online move operation, that may not work concurrently with the creation of a clean file snapshot are relatively rare.

The Write Clone Approach

One alternative to the copy-before-split approach to creating a clean file snapshot is referred to herein as the "write clone" approach. One embodiment of the write clone approach is illustrated in FIG. 5.

Figure 5:
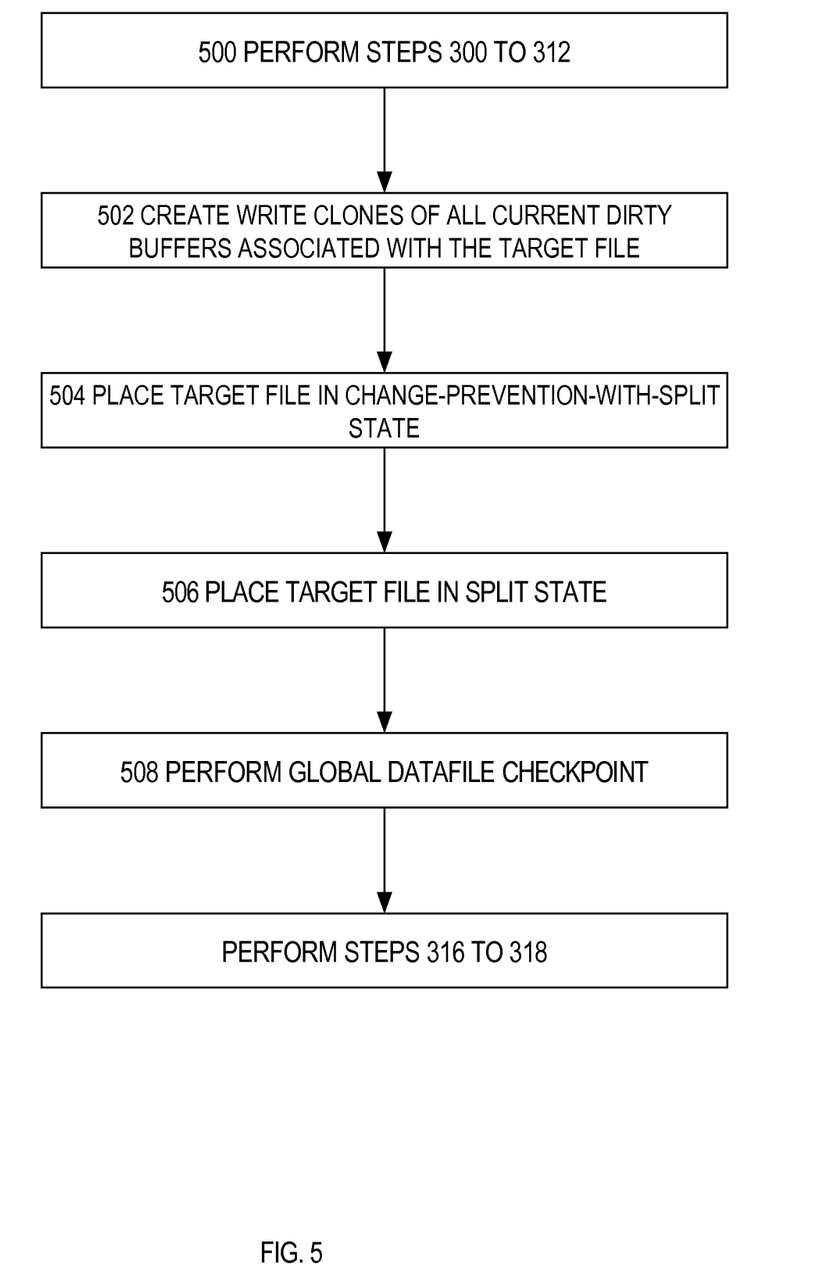
FIG. 5 is a flowchart illustrating steps for performing a clean file snapshot, according to one embodiment of a write clone approach.

Referring to FIG. 5, the write clone approach involves the same steps as the copy-before-split approach (illustrated in FIG. 3) except that the global datafile checkpoint operation performed at step 314 is replaced with steps 502 to 508. At step 502, rather than perform a global datafile checkpoint operation, all dirty buffers associated with the target file are placed in a WRITE-CLONE state. The dirty buffers of the target file may be placed in the WRITE-CLONE state by updating metadata (either within or external to the buffers themselves) to indicate the state of the buffers.

While a buffer is in the WRITE-CLONE state, a clone of the buffer is created whenever an attempt is made to update the buffer. For example, assume that a particular buffer (buffer $A_{original}$) is in the WRITE-CLONE state. If an attempt is made to perform an update to data in $A_{original}$, then a clone (buffer $A_{clone}$) of buffer $A_{original}$ is created. The clone $A_{clone}$ becomes the "current buffer" for the data contained therein, and therefore the new update and any subsequent updates are applied to $A_{clone}$. The clone buffers thus created are not themselves in the WRITE-CLONE state. Therefore, a subsequent update to the data in $A_{clone}$ will be applied to $A_{clone}$, and will not create yet another clone.

Alternatively, the transition to WRITE-CLONE state may cause clone buffers to be proactively created for all dirty buffers associated with the target file. Thus, the clone buffer creation overhead may be incurred up-front, rather than every time an update attempt is made to a dirty buffer associated with the target file.

If memory constraints prevent the creation of a clone of a buffer in response to an update attempt, then the contents of the buffer are flushed to disk (to both the primary copy and the snapshot copy). After the contents of the buffer have been flushed to disk, the metadata associated with the buffer may be changed to indicate no cloning is necessary, and the update may be applied to the buffer without making a clone.

At step 504, the target file is placed in CHANGE-PREVENTION-WITH-SPLIT state. CHANGE-PREVENTION-WITH-SPLIT state is similar to CHANGE-PREVENTION state, except that not all write I/Os go to both the primary copy and the snapshot copy. Instead, how the write I/Os are handled is based on whether the write I/Os are for buffers with updates after the snapshot time. Specifically, during the CHANGE-PREVENTION-WITH-SPLIT state:

write I/Os for buffers that have updates after the snapshot time are directed to only the primary copy     write I/Os for buffers that do not have any updates after the snapshot time are directed to both the primary copy and the snapshot copy During the CHANGE-PREVENTION-WITH-SPLIT state, if instance recovery needs to be performed, the instance recovery creates write clones below the snapshot time if the instance recovery process needs to apply changes to a recovery buffer beyond the snapshot time.

As soon as all database instances have acknowledged transition to the CHANGE-PREVENTION-WITH-SPLIT state, the target file is placed in a SPLIT state (step 506). The SPLIT state is similar to the CHANGE-PREVENTION-WITH-SPLIT state, except that updates to the target file are not prevented.

In multi-instance environments, the target file transitions from CHANGE-PREVENTION state to CHANGE-PREVENTION-WITH-SPLIT state at step 504 to prevent any instance from making changes above the snapshot time until every instance knows about the snapshot time, because such changes could propagate to the instances that do not know about the snapshot time (e.g. through instance recovery). Since this is not a problem in single-instance environments, the database server instance in a single instance environment may transition directly from the CHANGE-PREVENTION state to the SPLIT state (i.e. step 504 may be skipped).

At step 508, a global datafile checkpoint operation is performed. Because the global datafile checkpoint operation is performed while the target file is in the SPLIT state, the following rules continue to apply to the write I/Os performed during the checkpoint operation:

write I/Os for buffers that have updates after the snapshot time are directed to only the primary copy     write I/Os for buffers that do not have any updates after the snapshot time are directed to both the primary copy and the snapshot copy.

Upon completion of the global datafile checkpoint operation, the snapshot copy will reflect all updates made before the snapshot time, and no changes made after the snapshot time. Consequently, the snapshot copy will be a clean file snapshot of the target file as of the snapshot time. Steps 316 to 318 are then performed, as described above.

One advantage the write clone approach has over the copy-before-split approach is that the scope under which redo generation is suspended is further reduced, since creating write clones is typically much faster than checkpointing dirty buffers. Specifically, while changes to the target file are prevented for the duration of the checkpoint operation performed in step 314, changes to the target file are permitted during performance of the checkpoint operation performed in step 508.

The Split-Before-Copy Approach

Figure 6:
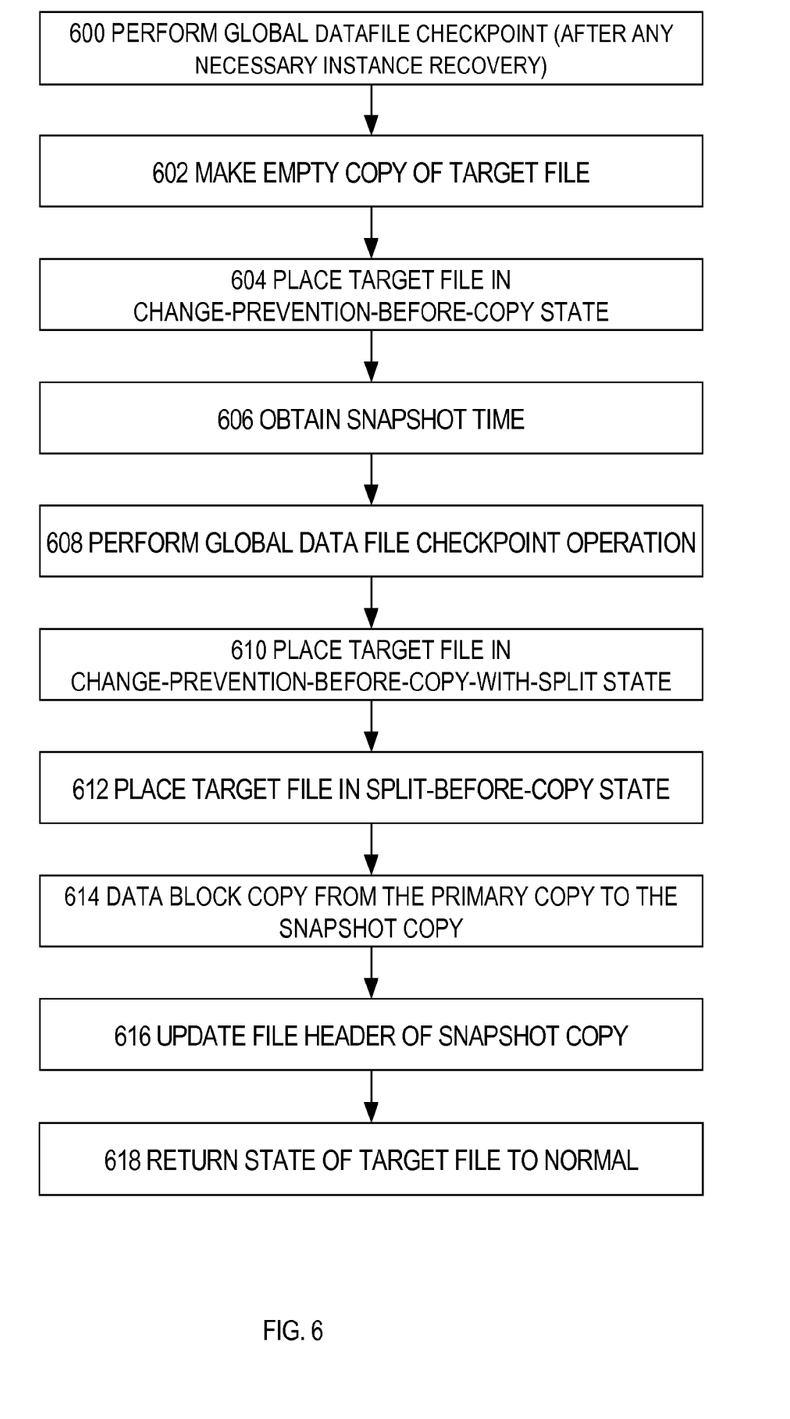
FIG. 6 is a flowchart illustrating steps for performing a clean file snapshot, according to one embodiment of a split-before-copy approach.

FIG. 6 is a flowchart illustrating steps for creating a clean file snapshot according to yet another embodiment. The embodiment illustrated in FIG. 6 is referred to herein as the "split-before-copy" approach because the snapshot time is obtained before any blocks are copied from the primary copy to the snapshot copy.

Referring to FIG. 6, at step 600 a global data file checkpoint operation is performed. The checkpoint operation of step 600 is performed while the target file is in its normal state, so additional changes may be made to the target file during the checkpoint operation.

At step 602, an empty copy of the target file is made. The empty copy made in step 602 is the snapshot copy that is updated to become a clean file snapshot of the target file during the subsequent steps, as shall be described hereafter.

At step 604, the target file is placed in a CHANGE-PREVENTION-BEFORE-COPY state. The CHANGE-PREVENTION-BEFORE-COPY state is similar to the CHANGE-PREVENTION state, described above, with the exception that write I/Os involving the target file are issued only to the primary copy (as opposed to both the primary copy and the snapshot copy). Thus, the properties of the CHANGE-PREVENTION-BEFORE-COPY state are as follows:

New changes to the target file are held up.

Redo generation will hang in the redo generation routine without holding hash latches or holding any current buffers pin exclusive, if the set of changes touch the target file. The hang will last until redo generation is no longer suspended.

No new non-logged cleanout is performed. The synchronization can be achieved by getting/releasing a correct set of latches (all hash latches) after an instance enters the state for the file.

Direct writes to the target object are prevented.

Read I/Os are issued to the primary copy only.

Write I/Os are issued to the primary copy only.

After the target file is placed in the CHANGE-PREVENTION-BEFORE-COPY state, a snapshot time is obtained in step 606. In addition, free-space direct writes can be handled in the same fashion as to how they are handled in CHANGE-PREVENTION state, described above. Because the snapshot time is obtained changes to the target file have stopped, the snapshot time is guaranteed to be later than the time associated with any changes to the target file before the target file entered the CHANGE-PREVENTION-BEFORE-COPY state.

At step 608, another global data file checkpoint operation is performed. After the global data file checkpoint of step 608 is performed, all of the changes made to the target file will have been written to disk (because any changes to the target file necessarily occurred before the target file was placed in the CHANGE-PREVENTION-BEFORE-COPY state, which itself is before the start of the checkpoint operation performed at step 608.

Because the global checkpoint operation of step 608 is performed while the target file is in the CHANGE-PREVENTION-BEFORE-COPY state, all write I/Os will be directed to only the primary copy. Thus, at the end of step 608, the primary copy will be a clean file snapshot of the target file as of the snapshot time, and the snapshot copy will still be empty.

At step 610, the target file is placed in a CHANGE-PREVENTION-BEFORE-COPY-WITH-SPLIT state. The CHANGE-PREVENTION-BEFORE-COPY-WITH-SPLIT state has properties similar to the CHANGE-PREVENTION state, with the exception that write I/Os involving the target file are issued to only the primary copy when the write involves any change after the snapshot time, and are issued to both the primary copy and the snapshot copy when the write does not involve any change after the snapshot time. Thus, the properties of the CHANGE-PREVENTION-BEFORE-COPY-WITH-SPLIT state are as follows:

New changes to the target file are held up.

Redo generation will hang in the redo generation routine without holding hash latches or holding any current buffers pin exclusive, if the set of changes touch the target file. The hang will last until redo generation is no longer suspended.

No new non-logged cleanout is performed. The synchronization can be achieved by getting/releasing a correct set of latches (all hash latches) after an instance enters the state for the file.

Direct writes to the target object are prevented.

Read I/Os of the target file are issued to the primary copy only.

Write I/Os, to the target file, with updates after the snapshot time are issued to the primary copy only.

Write I/Os, to the target file, with no updates after the snapshot time are issued to both the primary copy and the snapshot copy.

Figure 7:
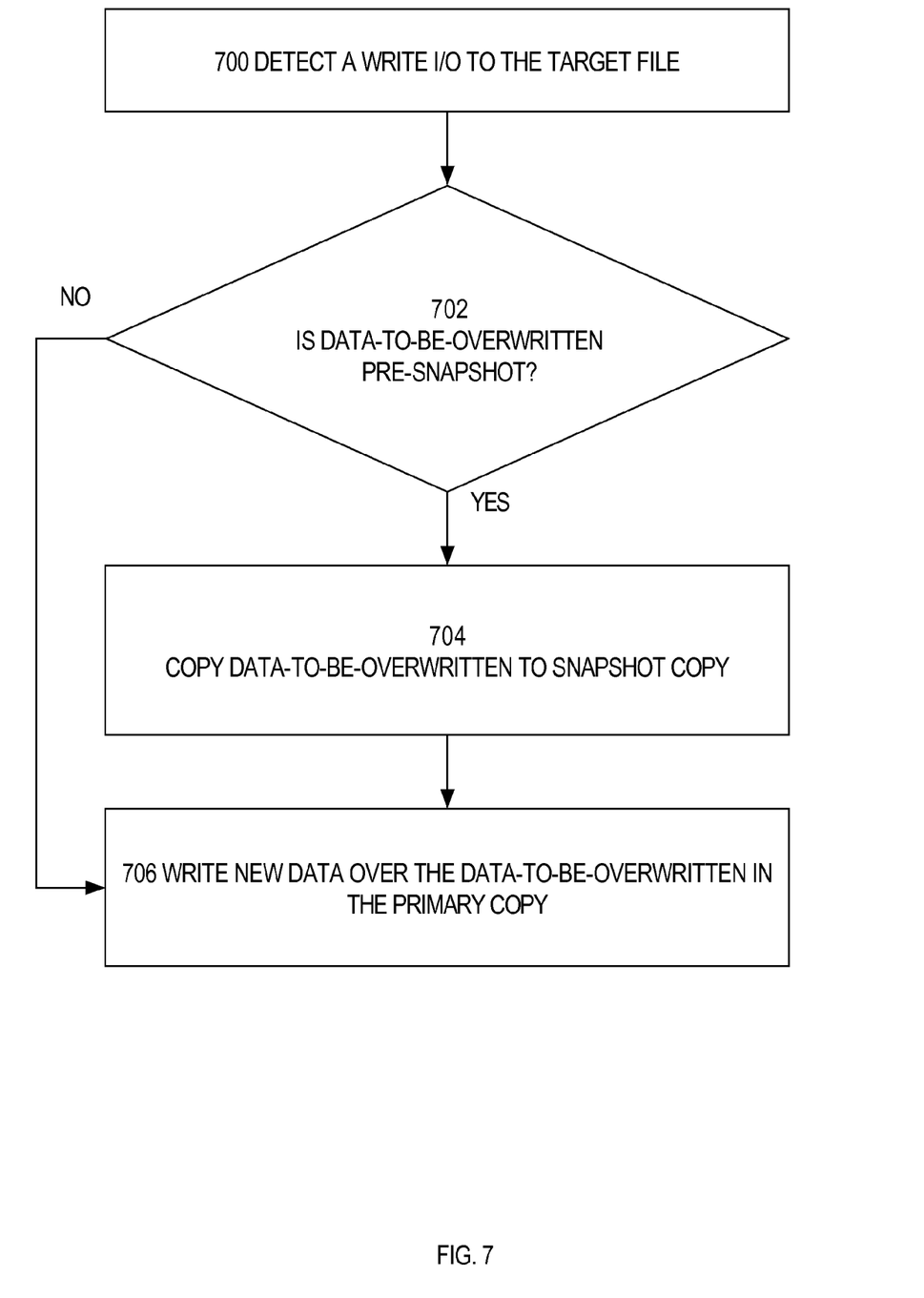
FIG. 7 is a flowchart illustrating how write I/Os to the target file may be handled when the target file is in a change-prevention-before-copy-with-split mode, according to one embodiment.

FIG. 7 is a flowchart illustrating how write I/Os to the target file are handled when the target file is in the CHANGE-PREVENTION-BEFORE-COPY-WITH-SPLIT state. While in the CHANGE-PREVENTION-BEFORE-COPY-WITH-SPLIT state, free-space direct writes can be handled in the same fashion as to how they are handled in the CHANGE-PREVENTION state, as described above.

Referring to FIG. 7, at step 700 a write I/O to the target file is detected. At step 702 it is determined whether the "data-to-be-overwritten" is "pre-snapshot". The data-to-be-overwritten is the data, within the primary copy, that will be overwritten when the write I/O is issued against the primary copy. The data-to-be-overwritten is "pre-snapshot" if the data-to-be-overwritten does not have any changes made after the snapshot time.

If the data-to-be-overwritten is pre-snapshot, then control passes to step 704 where the data-to-be-overwritten is copied to the snapshot copy. After the data-to-be-overwritten has been copied to the snapshot copy, control passes to step 706. If the data-to-be-overwritten is not pre-snapshot (e.g. the data-to-be-overwritten has at least one change that is after the snapshot time), then control passes from step 702 directly to step 706.

At step 706, the new data from the write I/O detected in step 700 is written to the primary copy.

Returning again to FIG. 6, after all database instances are known to be in the CHANGE-PREVENTION-BEFORE-COPY-WITH-SPLIT state, that target file is placed in a SPLIT-BEFORE-COPY state (step 612). In the case of a single instance database environment, step 610 may be skipped so that control proceeds directly from step 6608 to step 612.

The SPLIT-BEFORE-COPY state is similar to the SPLIT state (see step 506) except that write I/Os are handled in the same way as when in the CHANGE-PREVENTION-BEFORE-COPY-WITH-SPLIT state. Namely, in the SPLIT-BEFORE-COPY state, write I/Os to the target file are handled as follows:

Write I/Os, to the target file, with updates after the snapshot time are issued to the primary copy only.

Write I/Os, to the target file, with no updates after the snapshot time are issued to both the primary copy and the snapshot copy.

In addition, write I/Os that that are issued to the primary copy only (because they have updates after the snapshot time) are handled as described above with reference to FIG. 7.

At step 614, a data block copy is performed from the primary copy to the snapshot copy. During the copy, blocks are read from the primary copy. For each block, if the block is fractured (that is, in the process of being written to the primary copy), then the block is re-read for a reasonable number of times until it is no longer fractured. If, after a reasonable number of attempts to re-read the block, the block is still fractured, the block is treated as permanently physically corrupted.

For a block that is not physically corrupted, if the block timestamp is less than the snapshot timestamp, then the block is copied from the primary copy to the snapshot copy. Otherwise, if the block timestamp is more than the snapshot timestamp, the block is not copied from the primary copy to the snapshot copy (because the block will have already been copied to the snapshot copy when the newer-than-snapshot data was written to the block in the primary copy).

At the end of the data block copy operation of step 614, the snapshot copy is guaranteed to be a clean file snapshot of the target file that reflects the snapshot time obtained in step 606. Steps 616 and 618, which are similar to steps 316 and 318 described above, are then performed to return the target file to its normal state.

The SPLIT-BEFORE-COPY approach shown in FIG. 6 has an advantage over the approaches shown in FIGS. 3 and 5 at least in that the snapshot time is closer to the point-in-time at which the clean file snapshot creation operation is initiated.

Ongoing Mirroring

In the approaches described above, a clean file snapshot creation operation is initiated at a particular point in time. However, in an alternative embodiment, the preliminary steps for creating a clean file snapshot are ongoing. For example, during normal database operation the creation of a file may cause the creation of two files, and all I/O write operations may be directed against the two files. Under these circumstances, one of the two files may be treated as the primary copy, while the other treated as a mirror copy. When a clean file snapshot is desired, the database may proceed directly to step 304, or may skip step 614 (for the split-before-copy approach).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
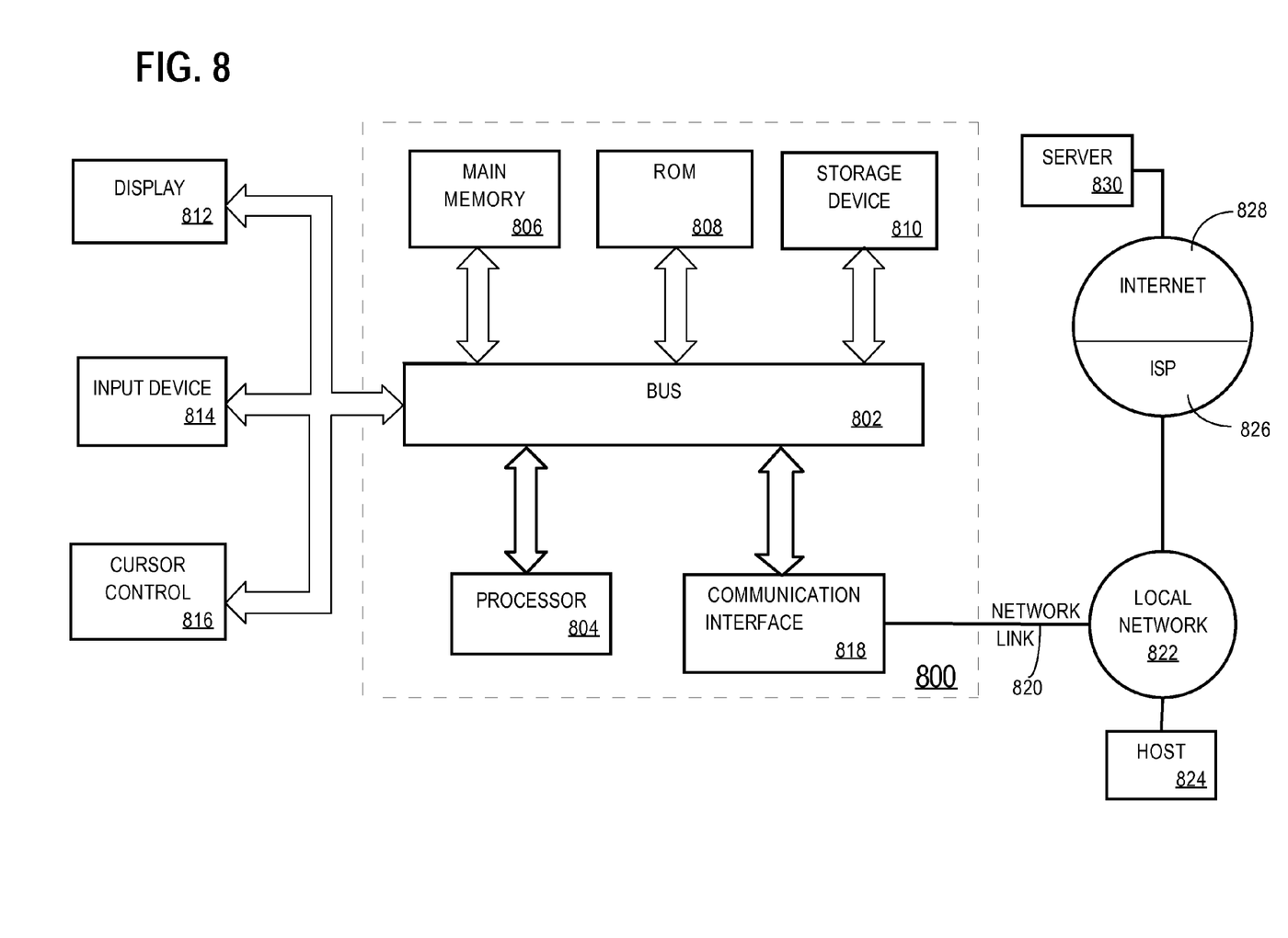
FIG. 8 is a block diagram of a computer system upon which embodiments of these approaches may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   placing a target file, which stores data for one or more objects of a database, in a first state in which:
      new changes to buffers containing data of the target file are allowed, and
      write I/Os to the target file are directed to both a primary copy of the target file and a snapshot copy of the target file;
   while the target file is in the first state, copying blocks from the primary copy to the snapshot copy;
   after the blocks from the primary copy have been copied to the snapshot copy, placing the target file in a second state in which:
      new changes to buffers containing data of the target file are not allowed;
      read I/Os of the target file are directed to the primary copy only; and
      write I/Os to the target file, which correspond to change made, before entering the second state, to buffers containing data of the target file, are directed to both the primary copy and the snapshot copy;
   while the target file is in the second state, obtaining a snapshot time and performing a global data file checkpoint operation;
   after the global data file checkpoint operation has completed, performing the steps of:
      placing the target file in a third state in which:
         new changes to buffers containing data of the target file are allowed; and
         read I/Os and write I/Os are directed to the primary copy; and
      updating a file header of the snapshot copy to identify the snapshot copy as a clean file snapshot of the target file as of the snapshot time;
   wherein the method is performed by one or more computing devices.

2. The method of claim 1 further comprising performing an initial global data file checkpoint operation while the target file is in the first state.

3. The method of claim 1 further comprising:
   incrementing a direct-write counter when the target file is placed in the second state;
   in response to a request to perform a direct-write operation, performing the steps of:
      (a) obtaining a start value of the direct-write counter;
      (b) after obtaining the start value, obtaining a logical timestamp;
      (c) after obtaining the logical timestamp, performing the direct-write operation;
      (d) after performing the direct-write operation, obtaining an end value of the direct-write counter;
      (e) if the start value does not equal the end value, then repeating steps (a) to (e);
      (f) if the start value equals the end value, then making data written as part of the direct-write operation part of the database, and associating the data with the logical timestamp obtained in step (b).

4. The method of claim 1 further comprising concurrently creating clean file snapshots of a plurality of files of the database, wherein the target file is one of the plurality of files.

5. The method of claim 1 wherein the database is concurrently accessed by a plurality of database server instances, and the method further comprises performing instance recovery before obtaining the snapshot time.

6. A method comprising:
   placing a target file, which stores data for one or more objects of a database, in a first state in which:
      new changes to buffers containing data of the target file are allowed, and
      write I/Os to the target file are directed to both a primary copy of the target file and a snapshot copy of the target file;
   while the target file is in the first state, copying blocks from the primary copy to the snapshot copy;
   after the blocks from the primary copy have been copied to the snapshot copy, placing the target file in a second state in which:
      new changes to buffers containing data of the target file are not allowed; and
      write I/Os to the target file, which correspond to change made, before entering the second state, to buffers containing data of the target file, are directed to both the primary copy and the snapshot copy;

while the target file is in the second state, obtaining a snapshot time and placing dirty buffers associated with the target file in a WRITE-CLONE state in which a clone of a first dirty buffer is created whenever an attempt is made to update the first dirty buffer;

after the dirty buffers associated with the target file are in the WRITE-CLONE state, performing the steps of:
placing the target file in a third state in which:
new changes to buffers containing data of the target file are allowed;
write I/Os for buffers that have changes after the snapshot time are only directed to the primary copy; and
write I/Os for buffers that have no changes after the snapshot time are directed to both the primary copy and the snapshot copy; and
while the target file is in the third state, performing a global data file checkpoint operation;

after the global data file checkpoint operation has completed, performing the steps of:
placing the target file in a fourth state in which:
new changes to buffers containing data of the target file are allowed; and
read I/Os and write I/Os are directed to the primary copy; and
updating a file header of the snapshot copy to identify the snapshot copy as a clean file snapshot of the target file as of the snapshot time;

wherein the method is performed by one or more computing devices.

7. The method of claim 6 further comprising performing an initial global data file checkpoint operation while the target file is in the first state.

8. The method of claim 6 wherein the database is concurrently accessed by a plurality of database server instances, and the method further comprises performing instance recovery before obtaining the snapshot time.

9. A method comprising:
placing a target file in a first state;
while the target file is in the first state, obtaining a snapshot time and performing a global data file checkpoint operation;
wherein the first state is a state in which:
new changes to buffers containing data of the target file are not allowed; and
write I/Os to the target file, which correspond to changes made, before entering the first state, to buffers containing data of the target file, are only issued to a primary copy of the target file;
after completing the global data file checkpoint operation, placing the target file in a second state in which:
new changes to buffers containing data of the target file are allowed;
write I/Os to the target file, with updates after the snapshot time, are only issued to the primary copy of the target file;
and are applied to the primary copy only after copying data that is to be overwritten by the updates, from the primary copy to a snapshot copy of the target file;
while the target file is in the second state, copying blocks from the primary copy to the snapshot copy, wherein copying blocks includes:
if a block in the primary copy does not have data that is newer than the snapshot time, then copying the block to the snapshot copy;
if a block in the primary copy has data that is newer than the snapshot time, then not copying the block to the snapshot copy;
wherein the method is performed by one or more computing devices.

10. The method of claim 9 further comprising, before placing the target file in the first state, performing an initial global data file checkpoint operation while the target file is in a normal state in which:
new changes to buffers containing data of the target file are allowed; and
all read I/Os and write I/Os involving the target file are issued to the primary copy of the target file.

11. One or more non-transitory computer-readable media storing instructions which, when executed by one or more computing devices, causes performance of a method comprising:
placing a target file, which stores data for one or more objects of a database, in a first state in which:
new changes to buffers containing data of the target file are allowed, and
write I/Os to the target file are directed to both a primary copy of the target file and a snapshot copy of the target file;
while the target file is in the first state, copying blocks from the primary copy to the snapshot copy;
after the blocks from the primary copy have been copied to the snapshot copy, placing the target file in a second state in which:
new changes to buffers containing data of the target file are not allowed;
read I/Os of the target file are directed to the primary copy only; and
write I/Os to the target file, which correspond to changes made, before entering the second state, to buffers containing data of the target file, are directed to both the primary copy and the snapshot copy;
while the target file is in the second state, obtaining a snapshot time and performing a global data file checkpoint operation;
after the global data file checkpoint operation has completed, performing the steps of:
placing the target file in a third state in which:
new changes to buffers containing data of the target file are allowed; and
read I/Os and write I/Os are directed to the primary copy; and
updating a file header of the snapshot copy to identify the snapshot copy as a clean file snapshot of the target file as of the snapshot time.

12. The one or more non-transitory computer-readable media of claim 11 wherein the method further comprises performing an initial global data file checkpoint operation while the target file is in the first state.

13. The one or more non-transitory computer-readable media of claim 11 wherein the method further comprises:
incrementing a direct-write counter when the target file is placed in the second state;
in response to a request to perform a direct-write operation, performing the steps of:
(a) obtaining a start value of the direct-write counter;
(b) after obtaining the start value, obtaining a logical timestamp;
(c) after obtaining the logical timestamp, performing the direct-write operation;
(d) after performing the direct-write operation, obtaining an end value of the direct-write counter;

(e) if the start value does not equal the end value, then repeating steps (a) to (e);

(f) if the start value equals the end value, then making data written as part of the direct-write operation part of the database, and associating the data with the logical timestamp obtained in step (b).

14. The one or more non-transitory computer-readable media of claim 11 wherein the method further comprises concurrently creating clean file snapshots of a plurality of files of the database, wherein the target file is one of the plurality of files.

15. The one or more non-transitory computer-readable media of claim 11 wherein the database is concurrently accessed by a plurality of database server instances, and the method further comprises performing instance recovery before obtaining the snapshot time.

16. One or more non-transitory computer-readable media storing instructions which, when executed by one or more computing devices, causes performance of a method comprising:
 placing a target file, which stores data for one or more objects of a database, in a first state in which:
  new changes to buffers containing data of the target file are allowed, and
  write I/Os to the target file are directed to both a primary copy of the target file and a snapshot copy of the target file;
 while the target file is in the first state, copying blocks from the primary copy to the snapshot copy;
 after the blocks from the primary copy have been copied to the snapshot copy, placing the target file in a second state in which:
  new changes to buffers containing data of the target file are not allowed; and
  write I/Os to the target file, which correspond to changes made, before entering the second state, to buffers containing data of the target file, are directed to both the primary copy and the snapshot copy;
 while the target file is in the second state, obtaining a snapshot time and placing dirty buffers associated with the target file in a WRITE-CLONE state in which a clone of a first dirty buffer is created whenever an attempt is made to update the first dirty buffer;
 after the dirty buffers associated with the target file are in the WRITE-CLONE state, performing the steps of:
  placing the target file in a third state in which:
   new changes to buffers containing data of the target file are allowed;
   write I/Os for buffers that have changes after the snapshot time are only directed to the primary copy; and
   write I/Os for buffers that have no changes after the snapshot time are directed to both the primary copy and the snapshot copy; and
  while the target file is in the third state, performing a global data file checkpoint operation;
 after the global data file checkpoint operation has completed, performing the steps of:
  placing the target file in a fourth state in which:
   new changes to buffers containing data of the target file are allowed; and
   read I/Os and write I/Os are directed to the primary copy; and
  updating a file header of the snapshot copy to identify the snapshot copy as a clean file snapshot of the target file as of the snapshot time.

17. The one or more non-transitory computer-readable media of claim 16 wherein the method further comprises performing an initial global data file checkpoint operation while the target file is in the first state.

18. The one or more non-transitory computer-readable media of claim 16 wherein the database is concurrently accessed by a plurality of database server instances, and wherein the method further comprises performing instance recovery before obtaining the snapshot time.

19. One or more non-transitory computer-readable media storing instructions which, when executed by one or more computing devices, causes performance of a method comprising:
 placing a target file in a first state;
 while the target file is in the first state, obtaining a snapshot time and performing a global data file checkpoint operation;
 wherein the first state is a state in which:
  new changes to buffers containing data of the target file are not allowed; and
  write I/Os to the target file, which correspond to changes made, before entering the first state, to buffers containing data of the target file, are only issued to a primary copy of the target file;
 after completing the global data file checkpoint operation, placing the target file in a second state in which:
  new changes to buffers containing data of the target file are allowed;
  write I/Os to the target file, with updates after the snapshot time, are only issued to the primary copy of the target file and are applied to the primary copy only after copying data that is to be overwritten by the updates, from the primary copy to a snapshot copy of the target file;
 while the target file is in the second state, copying blocks from the primary copy to the snapshot copy, wherein copying blocks includes:
  if a block in the primary copy does not have data that is newer than the snapshot time, then copying the block to the snapshot copy;
  if a block in the primary copy has data that is newer than the snapshot time, then not copying the block to the snapshot copy.

20. The one or more non-transitory computer-readable media of claim 19 wherein the method further comprises, before placing the target file in the first state, performing an initial global data file checkpoint operation while the target file is in a normal state in which:
 new changes to buffers containing data of the target file are allowed; and
 all read I/Os and write I/Os involving the target file are issued to the primary copy of the target file.

* * * * *